Patented Feb. 9, 1932

1,844,475

UNITED STATES PATENT OFFICE

JACQUE C. MORRELL AND LYMAN C. HUFF, OF CHICAGO, ILLINOIS, ASSIGNORS TO UNIVERSAL OIL PRODUCTS COMPANY, OF CHICAGO, ILLINOIS, A CORPORATION OF SOUTH DAKOTA

METHOD OF PREVENTING CORROSION IN OIL CRACKING SYSTEMS

No Drawing. Application filed July 15, 1926, Serial No. 122,743. Renewed February 23, 1929.

This invention relates to improvements in a method of preventing corrosion in oil cracking systems, and refers more particularly to the idea of introducing caustic in solution either alone or in combination with ammonia. The specific points and methods of introducing the caustic, or caustic saturated with ammonia, will be subsequently described.

It is well known that both caustic and ammonia may be used beneficially to materially decrease the amount of corrosion in an oil cracking system. Caustic, of course, being relatively cheaper than ammonia, would be preferable except that it possesses the disadvantage for this particular use of not being volatile. On the other hand, ammonia is volatile and more reactive, but at the same time is relatively more expensive. For some purposes, therefore, caustic will function admirably to decrease the extent of corrosion, while at other times a mixture of caustic and ammonia will function more advantageously. This invention in its broader aspects contemplates the use, therefore, of caustic alone or in combination with ammonia.

At the present time corrosion is a very vital problem to the owner of an oil cracking system. The utilization of the present invention, therefore, will be obvious.

The following may be illustrative of the present invention.

A caustic solution may be introduced to the dephlegmator of an oil cracking apparatus. Instead of being introduced separately, it may be mixed with part of the charging stock being introduced to said dephlegmator. While some of the water containing the caustic may evaporate upon the dephlegmator pans, observation has shown that suspended particles of caustic will reach the heating coil and eventually be deposited in the reaction chamber. Hence a certain amount of protection against corrosion owing to reaction with corrosive gases formed during the cracking process, such as hydrogen sulphide, will be afforded by the caustic.

The protection to the vapor zones, such as the upper part of the reaction chamber, the vapor line leading from the reaction chamber, and the vapor lines leading from the dephlegmator to the condenser, including the condenser, will be limited to that extent which the caustic removes the corrosive substances formed up to and through the heating coil. The introduction of ammonia into the caustic solution introduced into the dephlegmator will give protection to the vapor line leading from the dephlegmator and to the condenser owing to the fact that ammonia is a volatile substance and reacts very readily with corrosive gases such as the hydrogen sulphide formed during the cracking reaction.

A solution of caustic containing ammonia may also be introduced directly into the heating coil, the caustic functioning to protect in part the heating coil, while the ammonia not only assists in protecting the heating coil but functions also in protecting any vapor spaces within the heating coil. In addition, the ammonia will protect by neutralization of the corrosive gases the vapor zones in the reaction chamber and beyond to the dephlegmator, which includes the vapor line leading from the reaction chamber to the dephlegmator. Hence the mixture gives complete protection to the cracking system. It is obvious that the stream of caustic containing ammonia can be split so that part of the solution may be introduced into the dephlegmator and part into the heating coil. It is also obvious that caustic alone may be introduced into the dephlegmator and ammonia alone or in combination with caustic may be introduced into the heating coil. Further, the solution of caustic containing ammonia may be mixed with oil being charged into the system in the same manner as caustic alone may be mixed.

The foregoing description has been applied to a cracking apparatus of the tube and drum type, comprising generally a heating coil, an enlarged expansion chamber receiving the heated oil therefrom, a dephlegmator communicating with the vapor space of said expansion chamber and a condenser communicating with the upper portion of the dephlegmator.

It is to be understood that the present method is adapted for use with any type of oil cracking apparatus where corrosion might take place. The reason why the vapor space of the expansion chamber and the vapor line leading therefrom to the dephlegmator will be subjected to the action of a corrosive preventing material is that the ammonia when used, being volatile, will immediately mingle with the vapors and be carried therewith and, in addition, the major portion of the reaction takes place in the reaction chamber.

It is to be noted that anhydrous or gaseous ammonia may be utilized, as well as ammonia in solution. The caustic used may include sodium hydroxide, soda ash, and even such substances having alkaline reaction like sodium carbonate is contemplated as coming under the broad scope of the invention. As an illustration of the proportions which may be used, assume a California charging stock to contain 1 to 1½% sulphur, and further assume that it is desired to protect the cracking system from the corrosion resulting from the cracking of this oil; the caustic and ammonia may be used in combination.

For the amount of corrosive vapors which will be formed from the commercial cracking of this oil, one pound per barrel of ammonia or caustic will give sufficient protection in their respective zones to cut down the corrosion very substantially and effect a great saving in replacement and elimination of danger from the weakening of the system. A solution of caustic containing 20% of caustic by weight, more or less, is prepared and saturated with ammonia. Approximately an equal weight of ammonia may be dissolved in this solution or in somewhat less concentrated solutions. The total amount of the solution of caustic containing ammonia is so regulated that approximately one pound per barrel of charging oil of caustic and ammonia combined is fed into the cracking system.

It is understood that the relative amounts of caustic and ammonia in the solution may be shifted, depending upon conditions. For example, the solution may contain 15% of caustic and 20% of ammonia and the amount of solution used may be so regulated that approximately one pound of the dissolved substances per barrel of oil charged into the system may be used.

It is appreciated that the larger the amounts of these materials charged into the system with the oil, the greater the protection. Hence the above example is relative, and smaller amounts may be used with good results at reduced cost.

We claim as our invention:

1. A method for preventing corrosion in an oil cracking apparatus of the tube and drum type comprising introducing a solution containing caustic alkali to the heating coil with the liquid oil and also introducing a solution containing ammonia into the dephlegmator of the oil cracking apparatus whereby the caustic alkali prevents corrosion in that zone of the apparatus occupied by liquid oil and the ammonia prevents corrosion of that zone of the apparatus occupied by the vapors.

2. A method for preventing corrosion of an oil cracking apparatus comprising introducing into the apparatus a solution containing substantially one pound per barrel of charging oil of caustic alkali and ammonia.

3. A method for preventing corrosion of an oil cracking apparatus comprising introducing into the apparatus a solution containing substantially 15% caustic alkali and 20% ammonia, the combined alkali and ammonia totaling about one pound per barrel of charging oil.

JACQUE C. MORRELL.
LYMAN C. HUFF.